(12) United States Patent
Tateishi et al.

(10) Patent No.: US 9,845,753 B2
(45) Date of Patent: Dec. 19, 2017

(54) CONTROL APPARATUS FOR ENGINE

(71) Applicant: Mazda Motor Corporation, Aki-gun, Hiroshima (JP)

(72) Inventors: Masahiro Tateishi, Hatsukaichi (JP); Toru Kobayashi, Hiroshima (JP); Hiromu Sugano, Higashihiroshima (JP); Sotaro Yoshida, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 25 days.

(21) Appl. No.: 14/838,211

(22) Filed: Aug. 27, 2015

(65) Prior Publication Data

US 2016/0090931 A1 Mar. 31, 2016

(30) Foreign Application Priority Data

Sep. 29, 2014 (JP) ................................. 2014-198923

(51) Int. Cl.
| | |
|---|---|
| *F01L 13/06* | (2006.01) |
| *F02D 41/12* | (2006.01) |
| *F02D 41/04* | (2006.01) |
| *F02D 17/04* | (2006.01) |
| *F02D 41/00* | (2006.01) |
| *F02D 9/02* | (2006.01) |

(Continued)

(52) U.S. Cl.
CPC ............ *F02D 41/042* (2013.01); *F02D 17/04* (2013.01); *F02D 41/0007* (2013.01); *F02D 41/0205* (2013.01); *F02D 2009/0245* (2013.01); *F02D 2041/001* (2013.01); *F02D 2250/24* (2013.01); *F02M 26/05* (2016.02); *F02M 26/06* (2016.02); *F02M 26/24* (2016.02); *F02M 26/35* (2016.02); *F02M 26/47* (2016.02); *Y02T 10/42* (2013.01)

(58) Field of Classification Search
CPC .............. F02D 41/042; F02D 41/0205; F02D 41/0007; F02D 41/083; F02D 31/004; F02D 17/04; F02D 2250/24; F02D 2041/001; F02D 2009/0245; Y02T 10/42; F02M 26/47; F02M 26/24; F02M 26/05; F02M 26/35; F02M 26/06
USPC .............. 123/320–323, 325, 339.16, 339.17, 123/339.18, 399, 90.11, 90.15, 481, 123/568.21, 563, 559.1; 60/605.2; 701/103, 108, 110, 112, 113
See application file for complete search history.

(56) References Cited

U.S. PATENT DOCUMENTS 9,228,548 B2 * 1/2016 Takaki .................... F02B 37/00

FOREIGN PATENT DOCUMENTS

| DE | 102008001275 A1 | 11/2008 |
| EP | 2317100 A1 | 5/2011 |

(Continued)

*Primary Examiner* — Hai Huynh
(74) *Attorney, Agent, or Firm* — Alleman Hall Creasman & Tuttle LLP

(57) ABSTRACT

A control apparatus for an engine is provided. The control apparatus includes an intake control valve controller for fully closing, when an engine stop request is issued, an intake control valve for adjusting a flow rate of intake air passing through an intake passage of the engine, an engine speed increase controller for increasing an engine speed to reach a target speed after the intake control valve is fully closed by the intake control valve controller, and a fuel injection stopper for stopping a fuel injection after the engine speed is increased by the engine speed increase controller.

16 Claims, 6 Drawing Sheets

(51) Int. Cl.
    *F02M 26/05*     (2016.01)
    *F02M 26/06*     (2016.01)
    *F02M 26/24*     (2016.01)
    *F02M 26/35*     (2016.01)
    *F02M 26/47*     (2016.01)
    *F02D 41/02*     (2006.01)

(56) References Cited

FOREIGN PATENT DOCUMENTS

| | | | | |
|---|---|---|---|---|
| JP | 11-270372 | * | 10/1999 | ............ F02D 17/00 |
| JP | 2000240483 A | | 9/2000 | |
| JP | 2007-64032 | * | 3/2007 | ............ F02D 45/00 |
| JP | 2008291784 A | | 12/2008 | |
| JP | 2009074390 A | | 4/2009 | |
| JP | 2009074390 | * | 9/2009 | ............ F02D 41/04 |
| JP | 2013170564 A | | 9/2013 | |

\* cited by examiner

CONTROL APPARATUS FOR ENGINE

BACKGROUND

The present invention relates to a control apparatus for an engine, particularly to a control apparatus for an engine which performs an engine stop control.

Conventionally, it is known that when an engine installed in a vehicle gradually decelerates to stop, the engine and the mount thereof resonate and the vehicle may vibrate. Specifically, a frequency range where such resonance occurs (hereinafter, referred to as the "resonant frequency range") exists within a low engine speed range, and the vibration may occur when the engine speed passes through the resonant frequency range while the engine decelerates.

Therefore, techniques for suppressing such vibration caused in stopping the engine are proposed. JP2000-240483A discloses such a technique. According to JP2000-240483A, when an engine stop condition is satisfied, the engine speed is increased, a throttle valve is operated in a closing direction, and then the engine is stopped. In this manner, an intake air amount per engine cycle is reduced to suppress a change in engine load during a compression stroke and an expansion stroke. Thus, engine speed variation is suppressed, and the vibration caused by stopping the engine is suppressed.

According to JP2000-240483A, the engine speed is increased and then the throttle valve is operated in the closing direction to generate negative pressure within an intake passage. However, this method takes time in generating sufficient negative pressure within the intake passage (i.e., the pressure within the intake passage cannot be reduced quickly). The amplitude of the vibration caused within the resonant frequency range correlates with the negative pressure within the intake passage, specifically, the amplitude of the vibration becomes large if the negative pressure becomes low, and therefore, with the technique described in JP2000-240483A, sufficient negative pressure cannot be generated while the engine speed passes through the resonant frequency range, and the amplitude of the vibration cannot suitably be reduced. Further, with the technique described in JP2000-240483A, since it takes time to generate sufficient negative pressure, it also takes time to drop the engine speed to zero. Therefore, a length of time that the engine speed remains within the resonant frequency range while it decelerates becomes long, and the vibration cannot suitably be suppressed.

SUMMARY

The present invention is made in view of the above situations and aims to provide a control apparatus for an engine, which can promptly increase negative pressure within an intake passage of an engine installed in a vehicle and suitably suppress vibration in the vehicle caused in stopping the engine.

According to an aspect of the present invention, a control apparatus for an engine is provided. The control apparatus includes an intake control valve controller for fully closing, when an engine stop request is issued, an intake control valve for adjusting a flow rate of intake air passing through an intake passage of the engine, an engine speed increase controller for increasing an engine speed to reach a target speed after the intake control valve is fully closed by the intake control valve controller, and a fuel injection stopper for stopping a fuel injection after the engine speed is increased by the engine speed increase controller.

According to this configuration, when the engine stop request is issued, the intake control valve is fully closed, and after the intake control valve is fully closed, the engine speed is increased to reach the target speed. Thus, suction performance (intake performance) of the engine is improved by the engine speed increase. By sucking gas within the intake passage from the fully closed intake control valve into the engine, negative pressure within an intake-manifold (in-manifold negative pressure) can promptly be increased. Thus, the amplitude of vibration caused within a resonant frequency range can be reduced. Further, resistance which acts against a descending movement of a piston of the engine (i.e., intake stroke and expansion stroke) becomes high, and the engine speed promptly decreases. Therefore, a length of time that the engine speed remains within the resonant frequency range while it decelerates can be shortened. Thereby, according to this configuration, the vibration caused in the vehicle while stopping the engine can suitably be suppressed.

The engine is preferably provided with a turbocharger including movable flaps configured to adjust a turbocharging pressure. The control apparatus preferably further includes a flap controller for fully closing the flaps of the turbocharger when the engine stop request is issued.

According to this configuration, when the engine stop request is issued, since the flaps of the turbocharger are fully closed and exhaust pressure within an exhaust passage of the engine is increased, the resistance which acts on an elevating movement of the piston of the engine (i.e., compression stroke and exhaust stroke) becomes high, and the engine speed can effectively be reduced. Thus, the length of time that the engine speed remains within the resonant frequency range during deceleration can be shortened even more, and the vibration caused in the vehicle while stopping the engine can effectively be suppressed.

The engine is preferably provided with an alternator for generating electric power via a drive force of the engine. The control apparatus preferably further includes an alternator controller for increasing a load of the alternator when the engine stop request is issued.

According to this configuration, when the engine stop request is issued, since the load of the alternator is increased to increase the load applied to the engine, the engine speed can effectively be reduced. Thus, the length of time that the engine speed remains within the resonant frequency range during deceleration can be shortened even more, and the vibration caused in the vehicle while stopping the engine can effectively be suppressed.

The alternator controller preferably suspends the operation of the alternator once the engine stop request is issued, and preferably resumes the operation of the alternator to increase the load of the alternator after a predetermined period of time from the issuance of the engine stop request.

According to this configuration, the operation of the alternator is suspended once at the timing that the engine stop request is issued, and then the operation of the alternator is resumed after the predetermined time period from the issuance timing. Therefore, a sharp increase in voltage of a battery for receiving the generated power of the alternator can be prevented.

The control apparatus preferably further includes an air conditioner controller for increasing a load of an air conditioner when the engine stop request is issued.

According to this configuration, when the engine stop request is issued, since the load of the air conditioner is increased to increase the load applied to the engine, the engine speed can effectively be reduced. Thus, the length of time that the engine speed remains within the resonant frequency range during deceleration can be shortened even more.

The engine is preferably provided with an exhaust shutter valve for adjusting a flow rate of exhaust gas flowing through an exhaust passage of the engine. The control apparatus preferably further includes an exhaust shutter valve controller for closing the exhaust shutter valve when the engine stop request is issued.

According to this configuration, when the engine stop request is issued, since the exhaust shutter valve is fully closed and the exhaust pressure within the exhaust passage is increased, the engine speed can effectively be reduced. Thus, the length of time that the engine speed remains within the resonant frequency range during deceleration can be shortened even more.

The engine is preferably provided with an exhaust gas recirculation (EGR) device including an EGR passage for recirculating exhaust gas within the exhaust passage into the intake passage, and an EGR valve for adjusting a flow rate of the exhaust gas passing through the EGR passage. The control apparatus preferably further includes an EGR valve controller for closing the EGR valve of the EGR device when the engine stop request is issued.

According to this configuration, when the engine stop request is issued, since the EGR valve is closed to block the flow of gas between the exhaust passage and the intake passage, influence caused thereby on the in-manifold negative pressure, the exhaust pressure, etc. described as above (specifically, the decreases of the in-manifold negative pressure and the exhaust pressure) can be suppressed.

The intake control valve controller preferably adjusts the intake control valve to a control-wise fully closed position that is not a completely closed state, and then the intake control valve controller preferably further adjusts the intake control valve from the control-wise fully closed position to a mechanically fully closed position that is the completely closed state.

According to this configuration, the intake control valve is adjusted to the control-wise fully closed position once, and then the opening of the intake control valve is reduced even more from the control-wise fully closed position to reach the mechanically fully closed position. Thus, the flow of gas through the intake control valve can be blocked while suppressing application of an excess load on the intake control valve, and the in-manifold negative pressure can effectively be increased.

The engine speed increase controller preferably increases a fuel injection amount to increase the engine speed.

According to this configuration, by increasing the fuel injection amount, the engine speed can surely be increased to the target speed.

The control apparatus is preferably applied to an engine provided with the intake control valve at a position of the intake passage upstream of an intercooler for cooling intake air.

According to this configuration, since the intake control valve is provided upstream of the intercooler, a volume of the passage between the engine and the intake control valve is large, compared to a configuration in which the intake control valve is provided downstream of the intercooler. Thus, it is difficult to promptly generate sufficient in-manifold negative pressure by simply closing the intake control valve. However, with the configuration described above, since the intake control valve is fully closed and the engine speed is increased, the in-manifold negative pressure can promptly be increased. In other words, according to this configuration, even with the configuration in which the intake control valve is provided upstream of the intercooler for the reason of a layout, etc., the in-manifold negative pressure can suitably be increased.

DETAILED DESCRIPTION OF EMBODIMENT

Hereinafter, a control apparatus for an engine according to one embodiment of the present invention is described with reference to the appended drawings.

<System Configuration>

First, an engine system to which the control apparatus for the engine according to this embodiment of the present invention is applied is described with reference to FIG. 1 which is a schematic configuration view illustrating an engine system 200 to which the control apparatus for the engine according to this embodiment of the present invention is applied.

Figure 1:
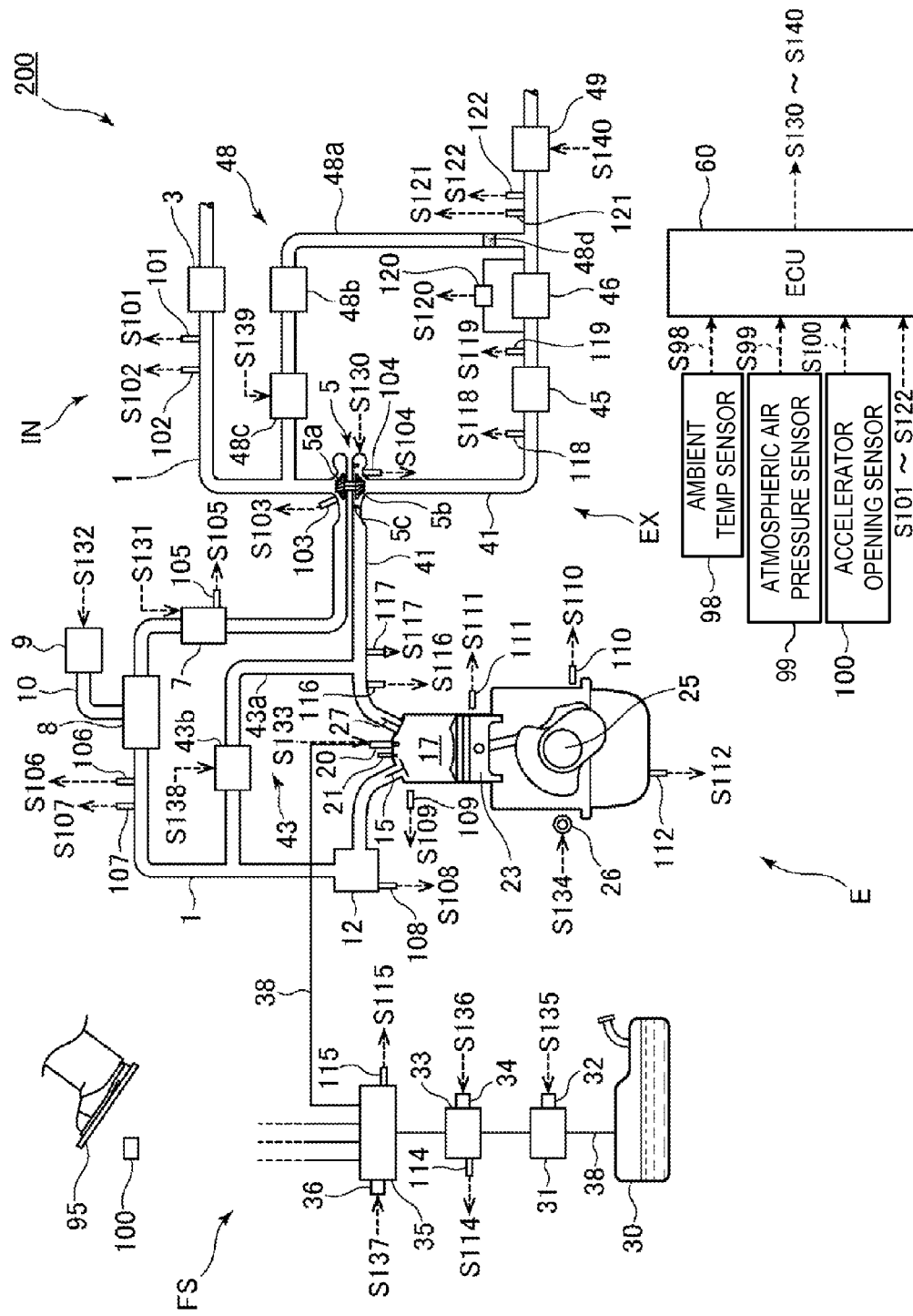
FIG. 1 is a schematic configuration view illustrating an engine system to which a control apparatus for an engine according to one embodiment of the present invention is applied.

As illustrated in FIG. 1, the engine system 200 mainly includes the engine E which is a diesel engine, an intake system IN for supplying intake air into the engine E, a fuel supply system FS for supplying fuel to the engine E, an exhaust system EX for discharging exhaust gas of the engine E, sensors 99 to 122 for detecting various statuses regarding the engine system 200, and an electronic control unit (ECU) 60 for controlling the engine system 200. The engine E is installed in a vehicle in this embodiment.

First, the intake system IN has an intake passage 1 through which the intake air passes. The intake passage 1 is provided with, from the upstream side, an air cleaner 3 for purifying fresh air introduced from outside, a compressor 5a provided at a turbocharger 5 and for increasing an intake air pressure by compressing the intake air passing therethrough, an intake shutter valve 7 for adjusting a flow rate of the intake air passing therethrough, an electric water pump 9 for controlling a flow rate of the coolant to be supplied to a water-cooled intercooler 8, a coolant passage 10 connecting the intercooler 8 with the electric water pump 9 and for recirculating the coolant therebetween, the water-cooled intercooler 8 provided in, for example, an intake manifold and for cooling the intake air by using a coolant supplied thereinto, and a surge tank 12 for temporarily storing the intake air to be supplied to the engine E.

Further, the intake system IN is provided with various sensors 101 to 103 and 105 to 108: an airflow sensor 101 for detecting an intake air amount and an intake air temperature sensor 102 for detecting an intake air temperature are provided at a position of the intake passage 1 immediately downstream of the air cleaner 3; a turbocharger speed sensor 103 for detecting a rotational speed of the compressor 5a (turbo speed) is provided at the compressor 5a of the turbocharger 5; an intake shutter valve position sensor 105 for detecting an opening of the intake shutter valve 7 is provided at the intake shutter valve 7; an intake air temperature sensor 106 for detecting an intake air temperature and an intake air pressure sensor 107 for detecting an intake air pressure are provided at positions of the intake passage 1 immediately downstream of the intercooler 8; and an intake manifold temperature sensor 108 for detecting an intake air temperature within the surge tank 12 is provided at the surge tank 12. The sensors 101 to 103 and 105 to 108 provided in the intake system IN output detection signals S101 to S103 and S105 to S108 corresponding to the detected parameters, respectively, to the ECU 60.

Next, the engine E includes an intake valve 15 for introducing the intake air supplied from the intake passage 1 (specifically, the intake manifold) into a combustion chamber 17, a fuel injection valve 20 for injecting the fuel to the combustion chamber 17, a glow plug 21 which is a supplementary heat source for securing ignitability when, for example, starting the engine E, a piston 23 for reciprocating with force caused by combustion of mixture gas within the combustion chamber 17, a crankshaft 25 for rotating with force caused by the reciprocation of the piston 23, and an exhaust valve 27 for discharging to the exhaust passage 41 exhaust gas produced by the combustion of mixture gas within the combustion chamber 17. Further, the engine E is provided with an alternator 26 that is rotated by the output of the engine E and for generating electric power via rotation. The alternator 26 charges the generated power to the battery (not illustrated). Additionally, the engine E is provided with a compressor of an air conditioner (not illustrated). The compressor is rotated by the output of the engine E.

Moreover, the engine E is provided with a coolant temperature sensor 109 for detecting a temperature of the coolant for cooling the engine E, a crank angle sensor 110 for detecting a crank angle of the crankshaft 25, an oil-pressure/temperature sensor 111 for detecting an oil pressure and/or an oil temperature, and an optical oil level sensor 112 for detecting an oil level. The sensors 109 to 112 provided at the engine E, output detection signals S109 to S112 corresponding to the detected parameters, respectively, to the ECU 60.

Next, the fuel supply system FS includes a fuel tank 30 for storing the fuel, and a fuel supply passage 38 for supplying the fuel from the fuel tank 30 to the fuel injection valve 20. The fuel supply passage 38 is provided with, from the upstream side, a low-pressure fuel pump 31, a high-pressure fuel pump 33, and a common rail 35. Moreover, a fuel warmer 32 is provided at the low-pressure fuel pump 31, a fuel pressure regulator 34 is provided at the high-pressure fuel pump 33, and a common rail depressurizing valve 36 is provided at the common rail 35.

Further, in the fuel supply system FS, a fuel temperature sensor 114 for detecting a fuel temperature is provided at the high-pressure fuel pump 33, and a fuel pressure sensor 115 for detecting a fuel pressure is provided at the common rail 35. The sensors 114 and 115 provided in the fuel supply system FS, output detection signals S114 and S115 corresponding to the detected parameters, respectively, to the ECU 60.

Next, the exhaust system EX includes the exhaust passage 41 where the exhaust gas passes. The exhaust passage 41 is provided with, from the upstream side, a turbine 5b provided at the turbocharger 5 and for driving the compressor 5a as described above by rotating with force of exhaust gas passing therethrough, a diesel oxidation catalyst (DOC) 45 and a diesel particulate filter (DPF) 46 having a purification function for the exhaust gas, and an exhaust shutter valve 49 for adjusting a flow rate of the exhaust gas passing therethrough. The DOC 45 is a catalyst for oxidizing hydrocarbons (HC) and carbon monoxide (CO) by using oxygen within the exhaust gas, so as to convert them into water and carbon dioxide. The DPF 46 is a filter for capturing particulate matter (PM) within the exhaust gas.

Further, in the exhaust system EX, an exhaust gas pressure sensor 116 for detecting an exhaust gas pressure and an exhaust gas temperature sensor 117 for detecting an exhaust gas temperature are provided at positions of the exhaust passage 41 upstream of the turbine 5b of the turbocharger 5, exhaust gas temperature sensors 118 and 119 for detecting exhaust gas temperatures are provided immediately upstream of the DOC 45 and between the DOC 45 and the DPF 46, respectively, a DPF pressure difference sensor 120 for detecting a difference in exhaust gas pressure between the upstream and downstream sides of the DPF 46 is provided at the DPF 46, a linear $O_2$ sensor 121 for detecting an oxygen concentration and an exhaust gas temperature sensor 122 for detecting an exhaust gas temperature are provided at positions of the exhaust passage 41 immediately downstream of the DPF 46. The sensors 116 to 122 provided in the exhaust system EX, output detection signals S116 to S122 corresponding to the detected parameters, respectively, to the ECU 60.

Moreover, in this embodiment, the turbocharger 5 is configured to be small in size so as to efficiently perform turbocharging even when the exhaust energy is low and the turbocharger 5 rotates at a low speed, and the turbocharger 5 is provided with a plurality of movable flaps 5c circumferentially surrounding the turbine 5b. The turbocharger 5 is configured as a variable geometry turbocharger (VGT) to change a cross-sectional area of a flow path of the exhaust gas flowing toward the turbine 5b (nozzle cross-sectional area) by the flaps 5c. For example, the flaps 5c are turned by an actuator via an electromagnetic valve which adjusts a negative pressure acting on a diaphragm. Moreover, a VGT opening sensor 104 for detecting openings of the flaps 5c (i.e., flap openings; hereinafter, suitably comprehensively referred to as the "VGT opening") based on a position of the actuator is provided. The VGT opening sensor 104 outputs a detection signal S104 corresponding to the detected VGT opening, to the ECU 60.

Here, the flaps 5c of the turbocharger 5 of this embodiment of the present invention are described in detail with reference to FIG. 2 which is an enlarged vertical-cross-sectional view of a schematic configuration of a turbine chamber 157a of the turbocharger 5.

Figure 2:
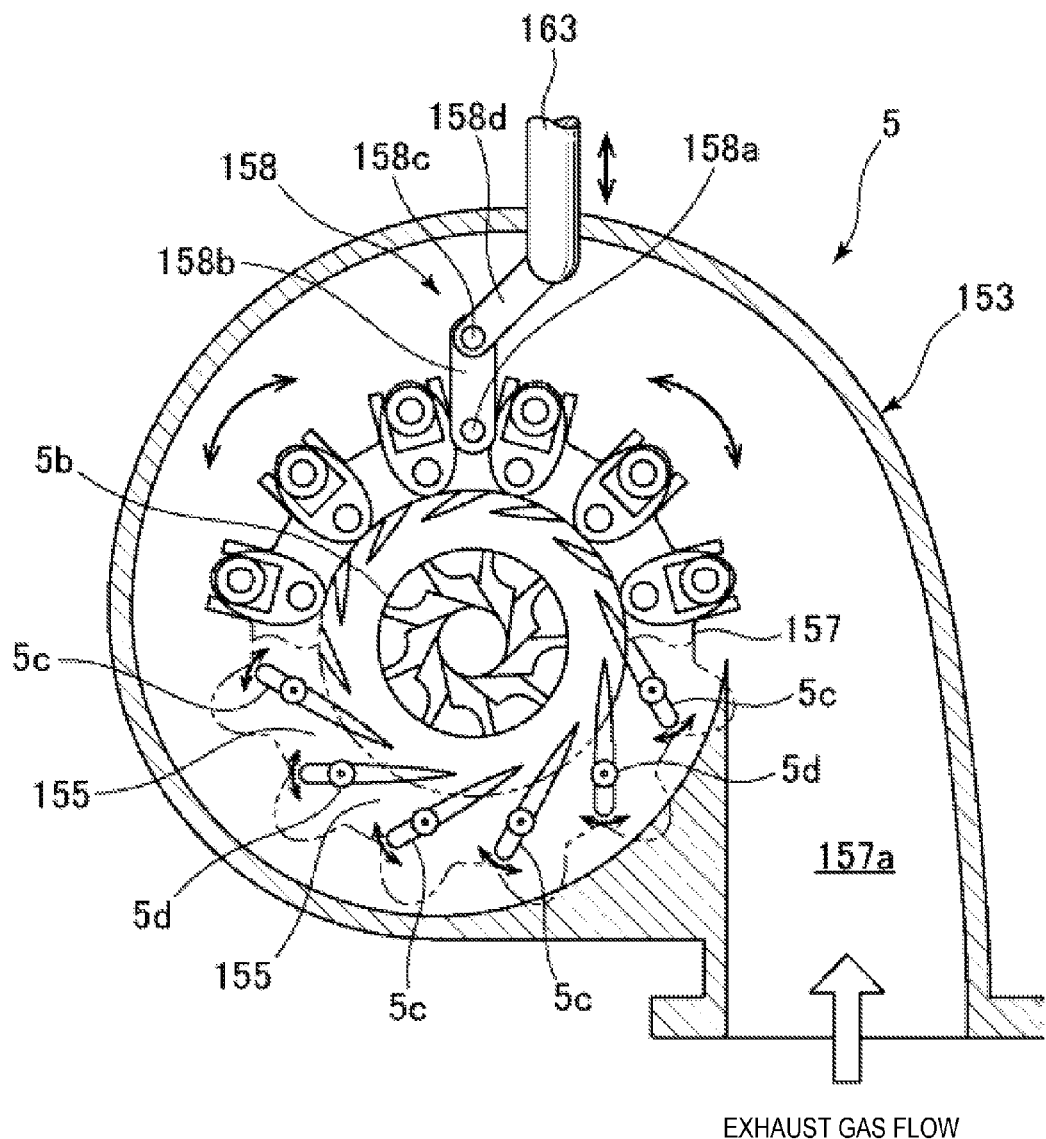
FIG. 2 is an enlarged vertical-cross-sectional view of a turbine chamber of a turbocharger of the embodiment of the present invention.

As illustrated in FIG. 2, the turbine chamber 157a formed inside a turbine casing 153 is provided with the plurality of movable flaps 5c surrounding the turbine 5b that is disposed in a substantially central section of the turbine chamber 157a. Each flap 5c is turnably supported by a spindle 5d penetrating one side wall of the turbine chamber 157a. The flap 5c turns in a clockwise fashion in FIG. 2 around the spindle 5d. Nozzles 155 are formed between the flaps 5c, respectively. When each flap 5c turns to incline closer to an adjacent flap thereto, an opening of each nozzle 155 (nozzle cross-sectional area) is reduced and high turbocharging efficiency can be obtained even when the exhaust flow rate is low. On the other hand, when each flap 5c is turned in the opposite direction so as to incline farther from an adjacent flap, the nozzle cross-sectional area becomes larger, and therefore, airflow resistance is reduced and the turbocharging efficiency can be improved even when the exhaust flow rate is high.

Further, a ring member 157 is coupled to a rod 163 of the actuator via a linkage mechanism 158, and when the actuator is activated, each flap 5c is turned via the ring member 157. Specifically, the linkage mechanism 158 includes a coupling pin 158a turnably coupled in its one end part to the ring member 157, a coupling plate member 158b turnably coupled in its one end part to the other end part of the coupling pin 158a, a pillar member 158c coupled at its one end part to the other end part of the coupling plate member 158b and penetrating an outer wall of the turbine casing 153, and a coupling plate member 158d coupled in its one end part to the projecting end part (i.e., the other end part) of the pillar member 158c. The other end part of the coupling plate member 158d is turnably coupled to the rod 163 of the actuator by a coupling pin (not illustrated).

Returning to FIG. 1, the engine system 200 of this embodiment also includes a high-pressure EGR device 43 and a low-pressure EGR device 48. The high-pressure EGR device 43 includes a high-pressure EGR passage 43a connecting the exhaust passage 41 at a position upstream of the turbine 5b of the turbocharger 5 with the intake passage 1 at a position downstream of the compressor 5a of the turbocharger 5 (downstream of the intercooler 8 to be specific), and a high-pressure EGR valve 43b for adjusting a flow rate of the exhaust gas passing through the high-pressure EGR passage 43a. The low-pressure EGR device 48 includes a low-pressure EGR passage 48a connecting the exhaust passage 41 at a position downstream of the turbine 5b of the turbocharger 5 (a position downstream of the DPF 46 and upstream of the exhaust shutter valve 49 to be specific) with the intake passage 1 at a position upstream of the compressor 5a of the turbocharger 5, a low-pressure EGR cooler 48b for cooling the exhaust gas passing through the low-pressure EGR passage 48a, a low-pressure EGR valve 48c for adjusting a flow rate of the exhaust gas passing through the low-pressure EGR passage 48a, and a low-pressure EGR filter 48d.

An exhaust gas amount recirculated into the intake system IN by the high-pressure EGR device 43 (hereinafter, referred to as the "high-pressure EGR gas amount") is substantially determined based on the exhaust gas pressure in the part upstream of the turbine 5b of the turbocharger 5, the intake air pressure produced depending on the opening of the intake shutter valve 7, and an opening of the high-pressure EGR valve 43b. Further, an exhaust gas amount recirculated into the intake system IN by the low-pressure EGR device 48 (hereinafter, referred to as the "low-pressure EGR gas amount") is substantially determined based on the intake air pressure in the part upstream of the compressor 5a of the turbocharger 5, the exhaust gas pressure produced depending on the opening of the exhaust shutter valve 49, and an opening of the low-pressure EGR valve 48c.

Figure 3:
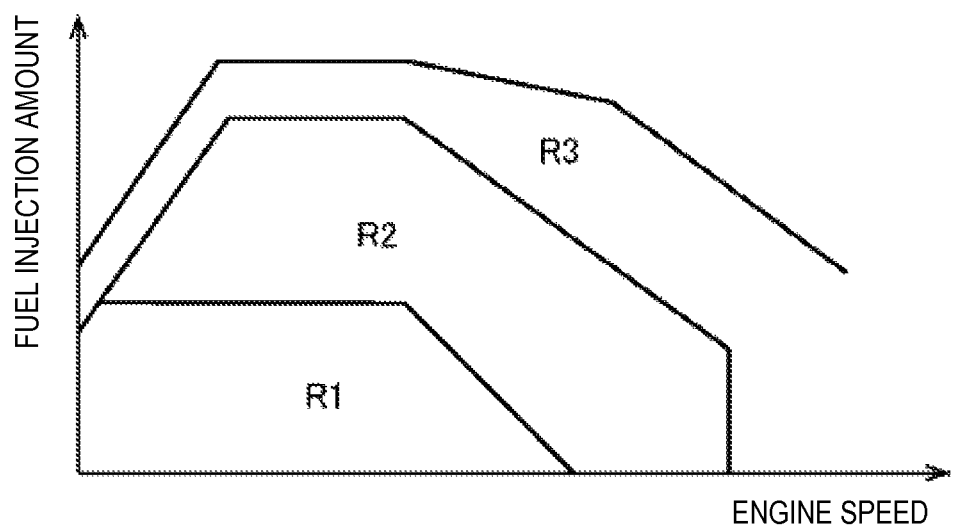
FIG. 3 is a chart for describing a high-pressure EGR range, a low-pressure EGR range, and a no-EGR range of the embodiment of the present invention.

Here, an operating range of the engine E where the high-pressure EGR device 43 is operated (hereinafter, referred to as the "high-pressure EGR range"), an operating range of the engine E where the low-pressure EGR device 48 is operated (hereinafter, referred to as the "low-pressure EGR range"), and a no-EGR range where neither the high-pressure EGR device 43 nor the low-pressure EGR device 48 is operated (hereinafter, referred to as the "no-EGR range") according to this embodiment are described with reference to FIG. 3. FIG. 3 is a chart schematically illustrating the high-pressure EGR range, the low-pressure EGR range, and the no-EGR range, in which the lateral axis indicates engine speed and the vertical axis indicates fuel injection amount (corresponding to engine load).

As illustrated in FIG. 3, an operating range R1 of the engine E (corresponding to the first engine operating range) where the engine load and the engine speed are low is the high-pressure EGR range where the high-pressure EGR device 43 is operated, and an operating range R2 of the engine E (corresponding to the second engine operating range) where the engine load and the engine speed are higher than the high-pressure EGR range R1 is the low-pressure EGR range where the low-pressure EGR device 48 is operated. More specifically, part of the low-pressure EGR range R2 (range near the boundary with the high-pressure EGR range R1) is a range where not only the low-pressure EGR device 48 but also the high-pressure EGR device 43 is operated, in other words, a combined-use range of the high-pressure EGR device 43 and the low-pressure EGR device 48. Moreover, an operating range R3 of the engine E defined to cover engine loads and engine speeds higher than those within the low-pressure EGR range R2 is the no-EGR range where neither the high-pressure EGR device 43 nor the low-pressure EGR device 48 is operated.

Returning to FIG. 1, the ECU 60 of this embodiment controls the respective components of the engine system 200 based on detection signals S98 to S100 outputted from an ambient temperature sensor 98 for detecting an ambient air temperature, an atmospheric air pressure sensor 99 for detecting an atmospheric air pressure, and an accelerator opening sensor 100 for detecting a position of an acceleration pedal 95 (accelerator opening), respectively, in addition to the detection signals S101 to S122 from the various sensors 101 to 122 described above. Specifically, the ECU 60 outputs a control signal S130 to the actuator (not illustrated) for driving the flaps 5c, so as to control the openings of the flaps 5c of the turbine 5b of the turbocharger 5 (VGT opening). Further, the ECU 60 outputs a control signal S131 to an actuator (not illustrated) for driving the intake shutter valve 7, so as to control the opening of the intake shutter valve 7. Moreover, the ECU 60 outputs a control signal S132 to the electric water pump 9, so as to control the flow rate of the coolant to be supplied to the intercooler 8. Further, the ECU 60 outputs a control signal S133 to the fuel injection valve 20, so as to control the fuel injection amount for the engine E etc. Moreover, the ECU 60 outputs control signals S134, S135, S136 and S137 to the alternator 26, the fuel warmer 32, the fuel pressure regulator 34, and the common rail depressurizing valve 36, so as to control them, respectively. Further, the ECU 60 outputs a control signal S138 to an actuator (not illustrated) for driving the high-pressure EGR valve 43b, so as to control the opening of the high-pressure EGR valve 43b. Moreover, the ECU 60 outputs a control signal S139 to an actuator (not illustrated) for driving the low-pressure EGR valve 48c, so as to control the opening of the low-pressure EGR valve 48c. Furthermore, the ECU 60 outputs a control signal S140 to an actuator (not illustrated) for driving the exhaust shutter valve 49, so as to control the opening of the exhaust shutter valve 49.

<Basic Control>

Figure 4:
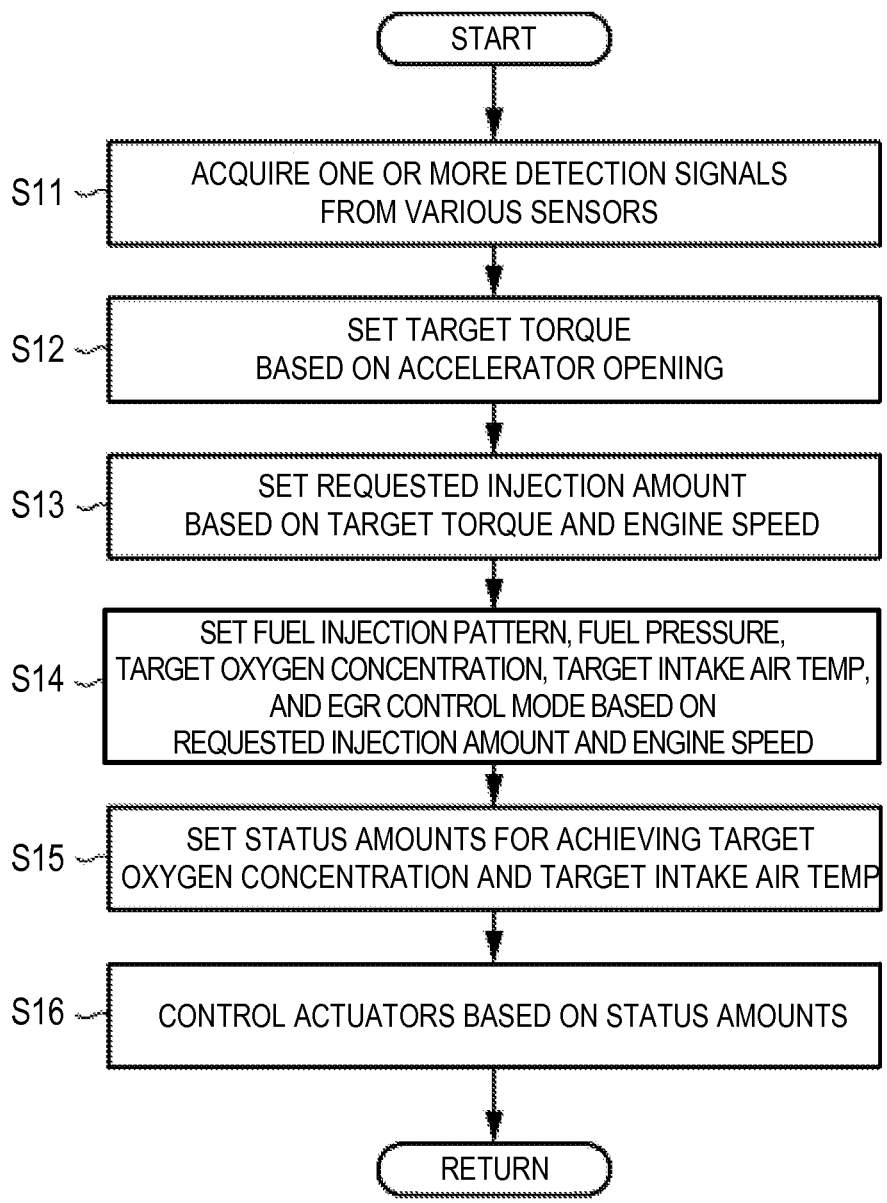
FIG. 4 is a flowchart illustrating a basic control of the embodiment of the present invention.

Next, a basic control performed by the engine system 200 of this embodiment of the present invention is described with reference to FIG. 4. FIG. 4 is a flowchart illustrating the basic control of this embodiment. In this flow, a control to achieve a target oxygen concentration and a target intake air temperature, for example, according to a requested injection amount of fuel is performed. Further, this flow is repeated at a predetermined cycle by the ECU 60.

First at S11, the ECU 60 acquires at least one of the detection signals S98 to S122 outputted from the various sensors 98 to 122 described above.

Next at S12, the ECU 60 sets a target torque to be outputted from the engine E based on the accelerator opening detected by the accelerator opening sensor 100 (corresponding to the detection signal S100).

Then at S13, the ECU 60 sets the requested injection amount to be injected from the fuel injection valve 20 based on the target torque set at S12 and the engine speed.

Subsequently at S14, based on the requested injection amount and the engine speed set at S13, the ECU 60 sets a fuel injection pattern, a fuel pressure, the target oxygen concentration, the target intake air temperature, and an EGR control mode (a mode of operating one or both of the high-pressure and low-pressure EGR devices 43 and 48, or a mode of operating neither the high-pressure EGR device 43 nor the low-pressure EGR device 48).

Next at S15, the ECU 60 sets status amounts for achieving the target oxygen concentration and the target intake air temperature set at S14. For example, the status amounts include the exhaust gas amount recirculated into the intake system IN by the high-pressure EGR device 43 (high-pressure EGR gas amount), the exhaust gas amount recirculated into the intake system IN by the low-pressure EGR device 48 (low-pressure EGR gas amount), and the turbocharging pressure caused by the turbocharger 5.

Subsequently at S16, the ECU 60 controls the actuators for driving the respective components of the engine system 200 based on the status amounts set at S15. In this case, the ECU 60 performs the control by setting restriction values or restriction ranges according to the status amounts, and setting control amounts of the actuators such that the status values follow the restrictions according to the restriction values or restriction ranges, respectively.

<Engine Stop Control>

Hereinafter, a control performed by the ECU 60 when stopping the engine E (engine stop control) of this embodiment of the present invention is described.

First, an outline of the engine stop control of this embodiment of the present invention is described. In this embodiment, when a request for stopping the engine E (engine stop request) is issued, to increase negative pressure within the intake passage 1 (specifically, negative pressure within the intake manifold), in other words, to reduce pressure within the intake manifold, the ECU 60 fully closes the intake shutter valve 7, and after the intake shutter valve 7 is fully closed, increases the engine speed to reach a predetermined target speed (hereinafter, suitably referred to as the "final target speed"), and then stops the fuel injection from the fuel injection valve 20. Hereinafter, such a control of increasing the negative pressure within the intake manifold (in-manifold negative pressure) is suitably referred to as the "in-manifold negative pressure increase control."

Here, the reason for performing the in-manifold negative pressure increase control in this embodiment is described. As described above, in stopping the engine E, the vehicle may vibrate (mount vibration may occur) when the engine speed passes through a resonant frequency range (e.g., a low engine speed range around 300 rpm) while the engine gradually decelerates. Since the amplitude of the vibration caused within the resonant frequency range correlates with the in-manifold negative pressure, specifically, since the amplitude of the vibration becomes smaller as the in-manifold negative pressure increases, the amplitude of the vibration can be reduced by promptly increasing the in-manifold negative pressure, and thus, the vibration can suitably be suppressed. Further, by promptly increasing the in-manifold negative pressure, the resistance which acts on the descending movement of the piston 23 of the engine E (i.e., intake stroke and expansion stroke) becomes high, and the engine speed promptly decreases. Therefore, a length of time that the engine speed remains within the resonant frequency range during deceleration becomes shorter and the vibration can suitably be suppressed.

In a vehicle where a throttle valve (corresponding to the intake shutter valve 7 in this embodiment) is provided downstream of the intercooler, when the engine stop request is issued, the in-manifold negative pressure can promptly be generated by closing the throttle valve. Specifically, with the configuration in which the throttle valve is provided downstream of the intercooler, since a volume of the passage between the engine and the throttle valve is small, sufficient in-manifold negative pressure for suppressing the vibration can promptly be generated. However, in the engine system 200 of this embodiment, since the intake shutter valve 7 is provided upstream of the intercooler 8 (because there is no space for the intake shutter valve 7 downstream of the intercooler 8 since the intercooler 8 is provided in the intake manifold), the volume of the passage between the engine E and the intake shutter valve 7 is large, and therefore, it is difficult to promptly generate sufficient in-manifold negative pressure for suppressing the vibration by simply closing the intake shutter valve 7.

Therefore, in this embodiment, when the engine stop request is issued, the intake shutter valve 7 is fully closed before the engine speed is increased, so as to promptly increase the in-manifold negative pressure. By increasing the engine speed in such a manner, the suction performance (intake performance) of the engine E is improved, and thus, the in-manifold negative pressure can promptly be increased. In this case, the ECU 60 increases the engine speed by increasing the fuel injection amount.

Since the engine E which is the diesel engine normally operates with excess air, even if the intake shutter valve 7 is closed to reduce the air amount and increase the fuel injection amount, the engine E can suitably perform combustion, and the engine speed can be increased. On the other hand, with a gasoline engine, since it basically operates with a theoretical air-fuel ratio, if the air amount is reduced and the fuel injection amount is increased in such a manner, the engine E cannot suitably perform combustion, and the engine speed cannot be increased.

Further, in this embodiment, in stopping the engine, the ECU 60 increases an exhaust gas pressure (exhaust pressure) that is a pressure within the exhaust passage 41 of the engine E (hereinafter, referred to as the "exhaust pressure increase control") in addition to performing the in-manifold negative pressure increase control for increasing the in-manifold negative pressure described above, so as to effectively reduce the engine speed. By increasing the exhaust pressure as above, the resistance which acts on the elevating movement of the piston 23 of the engine E (i.e., compression stroke and exhaust stroke) becomes high, and the engine speed can promptly be reduced. Specifically, when the engine stop request is issued, as the exhaust pressure increase control, the ECU 60 fully closes the flaps 5c (see FIG. 2) of the turbocharger 5 to increase the exhaust pressure. When the flaps 5c of the turbocharger 5 are fully closed in a state where the engine speed is increased by the in-manifold negative pressure increase control described above, the exhaust pressure is particularly effectively increased.

Further, in the case where the in-manifold negative pressure increase control and the exhaust pressure increase control are performed when the engine stop request is issued as above, the ECU 60 closes the high-pressure EGR valve 43b of the high-pressure EGR device 43 and the low-pressure EGR valve 48c of the low-pressure EGR device 48, so as to block the flow of gas between the exhaust and intake passages 41 and 1. Note that in the situation where the engine stop request is issued, the engine E is operated within the high-pressure EGR range R1 (see FIG. 3), and the low-pressure EGR valve 48c is already closed and only the high-pressure EGR valve 43b is opened. Therefore, the ECU 60 closes the high-pressure EGR valve 43b while keeping the low-pressure EGR valve 48c closed.

Moreover, in this embodiment, in stopping the engine, the ECU 60 performs a control for increasing the load of the engine E (hereinafter, referred to as the "engine load increase control") in addition to the in-manifold negative pressure increase control and the exhaust pressure increase control, so as to reduce the engine speed even more effectively. Specifically, the ECU 60 increases loads of the alternator 26 and the air conditioner when the engine stop request is issued, so as to increase the load applied on the engine E to promptly reduce the engine speed.

As described above, the ECU 60 may be referred to as "the control apparatus for the engine," and functions as the "intake control valve controller," "engine speed increase controller," "fuel injection stopper," "flap controller," "alternator controller," "air conditioner controller," and "EGR valve controller." Moreover, although described later in detail, the ECU 60 also functions as the "exhaust shutter valve controller."

Figure 5:
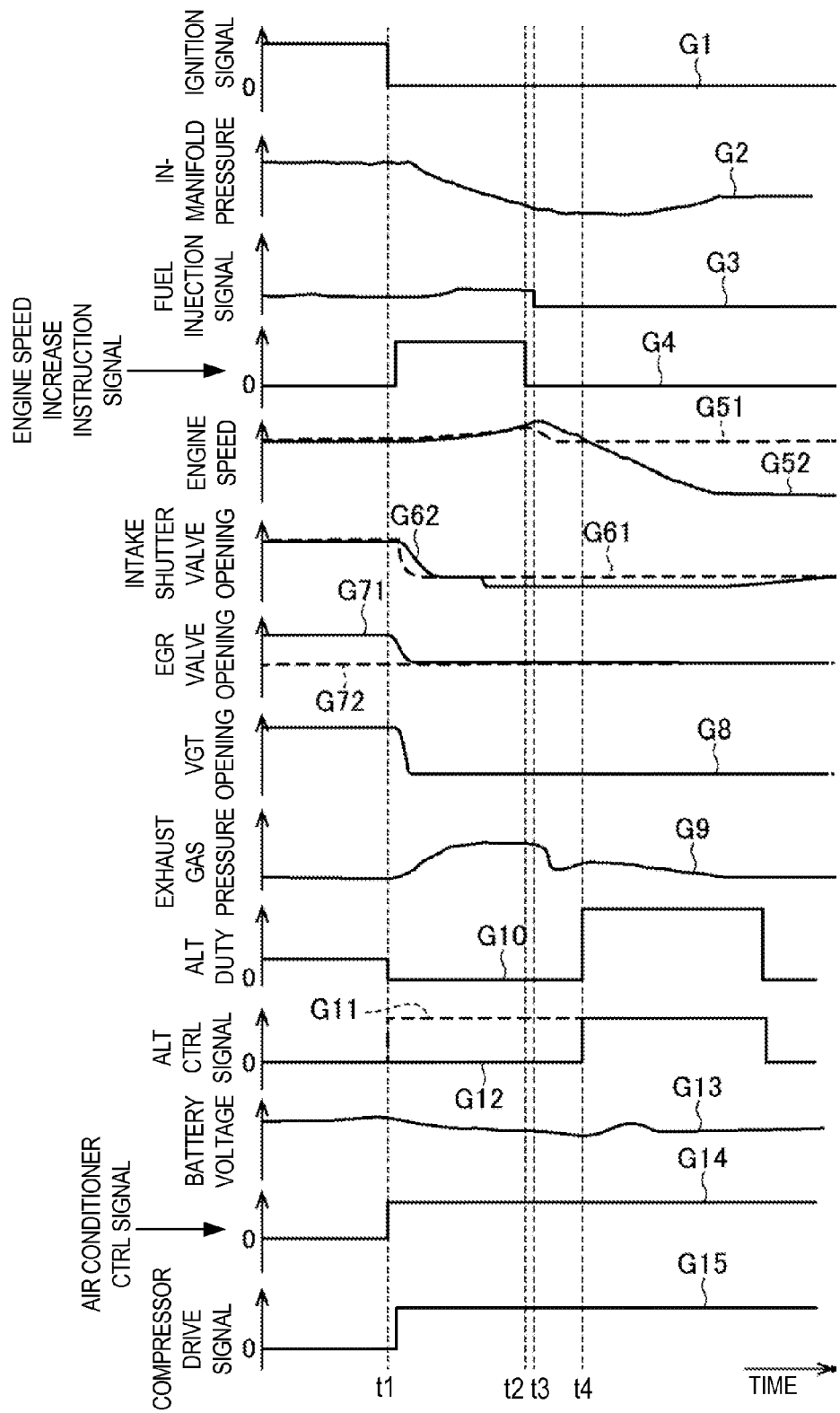
FIG. 5 shows timing charts for an engine stop control of the embodiment of the present invention.

Next, a timing chart for the engine stop control of this embodiment of the present invention is described with reference to FIG. 5. FIG. 5 illustrates an example of the timing chart when the engine stop control of this embodiment of the present invention is performed.

In FIG. 5, the horizontal axis indicates time, and the vertical axis indicates, from up to down, an ignition signal, the pressure within the intake manifold (in-manifold pressure), a fuel injection signal supplied to the fuel injection valve 20, an instruction signal for increasing the engine speed (engine speed increase instruction signal), the engine speed, the opening of the intake shutter valve 7 (intake shutter valve opening), the openings of the high and low-pressure EGR valves 43b and 48c, the openings of the flaps 5c of the turbocharger 5 (VGT opening), the exhaust pressure, a duty of the alternator 26, control signals of the alternator 26, the electric power of the battery for charging thereto the electric power generated by the alternator 26 and supplying the electric power to various auxiliaries in the vehicle, a control signal of the air conditioner, and a drive signal of the compressor of the air conditioner.

First, at a timing t1, the ignition signal is switched from on to off (see G1 in the chart), and the engine stop request is issued. In other words, the parts of the chart in FIG. 5 before the timing t1 indicate respective states while the engine is operated normally. At the timing t1, the ECU 60 starts the in-manifold negative pressure increase control. Specifically, the ECU 60 turns on the engine speed increase instruction signal (see G4 in the chart), and the target speed of the engine speed is gradually increased (see G51 in the chart). In this case, the ECU 60 gradually increases the target speed to reach a predetermined final target speed (e.g., higher than the idle speed by about 75 to 100 rpm). The ECU 60 increases the fuel injection signal (see G3 in the chart) so as to increase the fuel injection amount according to the increased target torque by a feedback control performed based on such a target speed. As a result, the actual engine speed is gradually increased (see G52 in the chart). Note that if the load of some sort of component in the vehicle is reduced, there may be a case where the fuel injection amount is not increased according to the increase of the target speed.

Further, as the in-manifold negative pressure increase control, the ECU 60 also controls the intake shutter valve 7. Specifically, at the timing t1, the ECU 60 reduces a target opening of the intake shutter valve 7 in a stepwise fashion (see G61 in the chart) so as to adjust the intake shutter valve 7 to a control-wise fully closed position, which is not a completely closed state. As a result, the actual opening of the intake shutter valve 7 shifts toward the closing side, and the intake shutter valve 7 is adjusted to the control-wise fully closed position (see G62 in the chart). Then, the ECU 60 reduces the opening of the intake shutter valve 7 even more from the control-wise fully closed position, so as to reach the mechanically fully closed position, which is the completely closed state (see G62 in the chart). In this case, for a predetermined period of time, the ECU 60 controls the actuator for driving the intake shutter valve 7, to forcibly keep the intake shutter valve 7 at the mechanically fully closed position.

In this embodiment, the intake shutter valve 7 is adjusted to the mechanically fully closed position corresponding to an even smaller opening than the control-wise fully closed position which is normally used, so as to effectively increase the in-manifold negative pressure. If the intake shutter valve 7 in an opened state is adjusted to the mechanically fully closed position directly, an excess load will be applied to the intake shutter valve 7. Therefore, in this embodiment, the intake shutter valve 7 is adjusted to the control-wise fully closed position once and then adjusted to the mechanically fully closed position, so as to prevent such an excess load. Additionally, since adjusting the intake shutter valve 7 to the mechanically fully closed position causes a load on the actuator, the length of time that the intake shutter valve 7 is kept at the mechanically fully closed position is limited to the predetermined time period.

By controlling the engine speed and the intake shutter valve 7 by the in-manifold negative pressure increase control as above, the in-manifold pressure drops (see G2 in the chart), in other words, the in-manifold negative pressure increases.

Further, at the timing t1, the ECU 60 fully closes the high-pressure EGR valve 43b (see G71 in the chart) while keeping the low-pressure EGR valve 48c fully closed (see G72 in the chart), and performs the exhaust pressure increase control in which the VGT opening of the turbocharger 5 is fully closed (see G8 in the chart). By fully closing the VGT opening as above, the exhaust pressure is increased (see G9 in the chart).

Note that since the high-pressure EGR valve 43b and the flaps 5c of the turbocharger 5 are control targets related to volume, in view of controllability, the control thereof is preferably started immediately after the engine stop request is issued. Especially the flaps 5c of the turbocharger 5 are preferably controlled such that a desired exhaust pressure (specifically, the pressure with which the engine speed can effectively be reduced) is secured by the timing that the engine speed reaches the final target speed.

Moreover, at the timing t1, the ECU 60 turns on the control signal of the air conditioner (see G14 in the chart) to start driving the compressor of the air conditioner (see G15 in the chart), so as to perform the engine load increase control. Furthermore, at the timing t1, the ECU 60 adjusts the duty of the alternator 26 to 0% (see G10 in the chart), and turns on the control signal for deactivating the alternator 26 (see G11 in the chart). In this embodiment, when the battery is in the fully charged state, to prevent a sharp increase of the battery voltage by the generated power of the alternator 26, when the engine stop request is issued, the alternator 26 is temporarily turned off to use the battery power, so that the battery voltage (battery volume) is reduced (see G13 in the chart).

Note that the air conditioner does not cause such an issue that arises when the alternator 26 is instantly turned on, and requires time for the pressure of the compressor to increase to be sufficiently high after the compressor is activated. Therefore, the air conditioner is preferably turned on immediately after the issuance of the engine stop request.

Then, at a timing t2 that is after a first period of time from the timing t1 at which the engine stop request is issued, the ECU 60 turns off the engine speed increase instruction signal (see G4 in the chart), and gradually decreases the target speed of the engine speed to the idle speed (see G51 in the chart). Further, immediately after the timing t2, specifically at a timing t3 that is after a second period of time from the timing t1, the ECU 60 turns the fuel injection signal to "0" to stop the fuel injection (see G3 in the chart). As a result, after the timing t3, the actual engine speed decreases (see G52 in the chart).

Note that the first period of time is obtained based on predetermined equation(s) or experiment(s) so as to be a period of time required for the actual engine speed to reach the final target speed described above. Moreover, the second period of time is set slightly longer than the first time period so as to maintain the engine speed until the fuel injection is stopped (or may be set as same as the first time period). For example, the second time period is set to 0.5 seconds.

Further, at a timing t4 that is after a third period of time from the timing t1, the ECU 60 performs the engine load increase control by increasing the duty of the alternator 26 to be close to 100% (see G10 in the chart) and turning on the control signal for activating the alternator 26 (see G12 in the chart). The third period of time is set such that even if the battery is in a state where it is easily overcharged (e.g. fully charged state) at the timing t1, after the third time period, issues such as the battery voltage sharply increasing as described above do not arise even if the alternator 26 is driven. Additionally, the third time period is set such that the timing t4 precedes the drop of the engine speed to the resonant frequency range, because if the alternator 26 is activated when the engine speed is around the resonant frequency range or below the resonant frequency range, the effect of shortening the length of time that the engine speed remains within the resonant frequency range by reducing the engine speed with the load caused by the alternator 26 will be diminished.

According to the controls described above (in-manifold negative pressure increase control, exhaust pressure increase control, and engine load increase control), the engine speed is promptly reduced (see G52 in the chart) by the decrease of the in-manifold pressure (see G2 in the chart), in other words, the increase of the in-manifold negative pressure, the increase of the exhaust pressure (see G9 in the chart), and the increase of the engine load. Thus, the length of time that the engine speed remains within the resonant frequency range during deceleration becomes shorter, and also, the amplitude of the vibration can be reduced by the sufficiently secured in-manifold negative pressure. Therefore, according to this embodiment, the vibration in the vehicle can effectively be suppressed.

Figure 6:
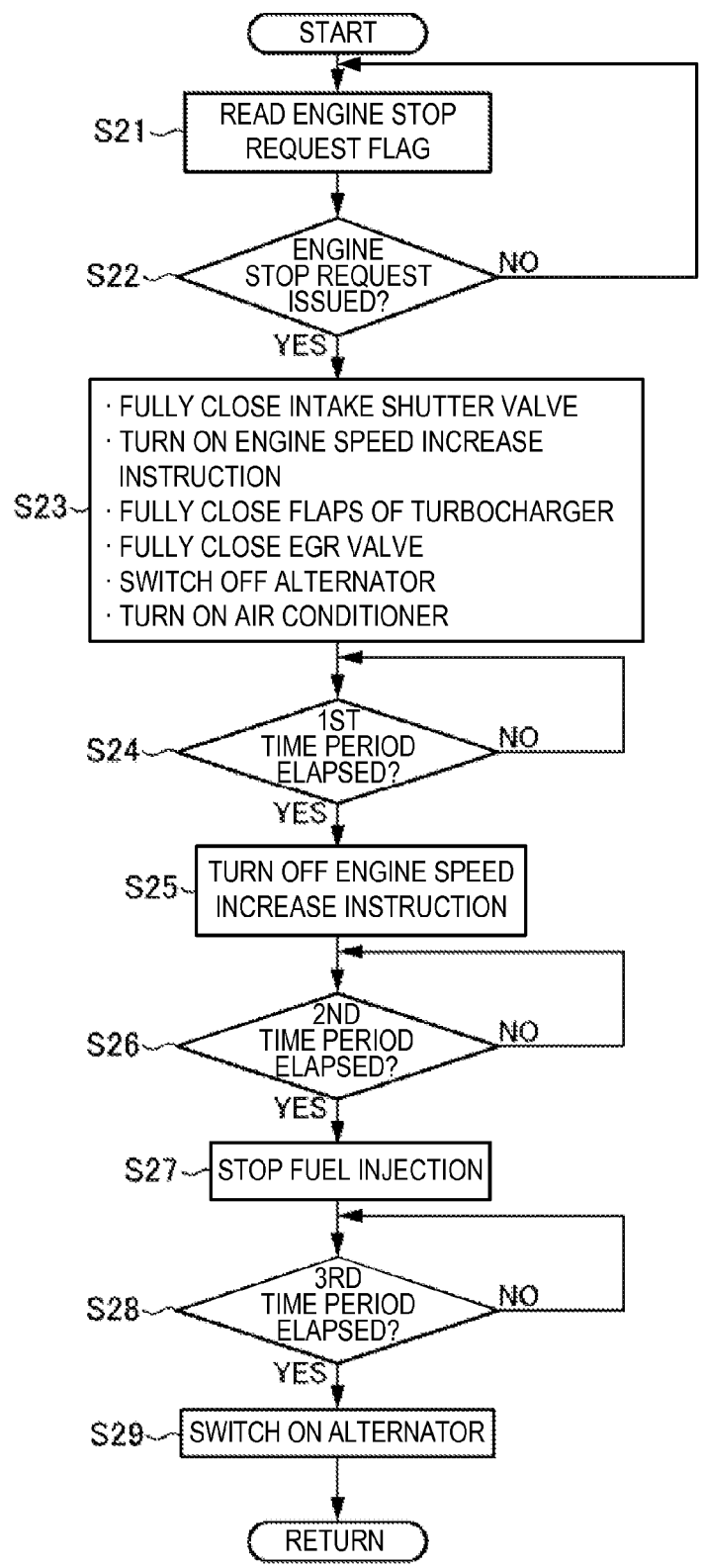
FIG. 6 is a flowchart illustrating the flow of the engine stop control of the embodiment of the present invention.

Next, the entire flow of the engine stop control of this embodiment of the present invention is described in detail with reference to FIG. 6. FIG. 6 is a flowchart illustrating the flow of the engine stop control of the embodiment of the present invention. The flow of the engine stop control is repeated in a predetermined cycle by the ECU 60.

First, at S21, the ECU 60 reads a flag indicating the engine stop request (engine stop request flag). The engine stop request flag is turned on in a key-off state, in an ignition off state, or during an idle stop.

Next at S22, the ECU 60 determines whether the engine stop request has issued based on the engine stop request flag read at S21. If the engine stop request is determined as not having been issued as a result (S22: NO), in other words, the engine stop request flag is off, the flow is terminated (returns back to S21). In this case, the ECU 60 does not perform the engine stop control of this embodiment.

On the other hand, if the engine stop request is determined as issued (S22: YES), in other words, if the engine stop request flag is on, the flow proceeds to S23. At S23, the ECU 60 fully closes the intake shutter valve 7 (control (1)), turns on the engine speed increase instruction (control (2)), fully closes the flaps 5c of the turbocharger 5 (fully closes the VGT opening) (control (3)), fully closes the high-pressure EGR valve 43b (while keeping the low-pressure EGR valve 48c fully closed (control (4)), turns the alternator 26 off (control (5)), and turns the air conditioner on (control (6)). In other words, the ECU 60 performs the in-manifold negative pressure increase control, the exhaust pressure increase control, and the engine load increase control.

More specifically, in the control (1), the ECU 60 adjusts the intake shutter valve 7 to the control-wise fully closed position which is not the completely closed state, and then the ECU 60 reduces the opening of the intake shutter valve 7 even more from the control-wise fully closed position, so as to maintain the intake shutter valve 7 at the mechanically fully closed position which is the completely closed state, for the predetermined time period. Moreover, in the control (2), the ECU 60 turns on the engine speed increase instruction, and increases the injection amount of fuel injected from the fuel injection valve 20 so that the engine speed gradually increases to the predetermined final target speed (e.g., higher than the idle speed by about 75 to 100 rpm).

Next at S24, the ECU 60 determines whether the first time period has elapsed since the engine stop request was issued. If the first time period is determined to have elapsed (S24: YES), the flow proceeds to S25, where the ECU 60 switches the engine speed increase instruction from on to off, to reduce the target speed of the engine speed (e.g., reduce the target speed to the idle speed). On the other hand, if the first time period is determined to not have elapsed (S24: NO), the flow returns back to S24. In other words, the determination at S24 is repeated until the first time period has elapsed.

Then at S26, the ECU 60 determines whether the second time period has elapsed since the engine stop request was issued. If the second time period is determined to have elapsed (S26: YES), the flow proceeds to S27, where the ECU 60 stops the fuel injection from the fuel injection valve 20. On the other hand, if the second time period is determined to not have elapsed (S26: NO), the flow returns back to S26. In other words, the determination at S26 is repeated until the second time period has elapsed.

Note that the second time period may be the same as the first time period, and in such a case, the ECU 60 may turn off the engine speed increase instruction and stop the fuel injection once the first time period has elapsed since the engine stop request was issued.

Next at S28, the ECU 60 determines whether the third time period has elapsed since the engine stop request was issued. If the third time period is determined to have elapsed (S28: YES), the flow proceeds to S29, where the ECU 60 switches the alternator 26 from off to on and performs the engine load increase control. On the other hand, if the third time period is determined to not have elapsed (S28: NO), the flow returns back to S28. In other words, the determination at S28 is repeated until the third time period has elapsed.

Note that the third time period may be shorter than the first time period or the second time period, and in such a case, the ECU 60 may turn on the alternator 26 before turning off the engine speed increase instruction or before stopping the fuel injection.

<Operations and Effects>

Next, the operations and effects of the control apparatus for the engine according to this embodiment of the present invention are described.

According to this embodiment, when the engine stop request is issued, the in-manifold negative pressure increase control in which the intake shutter valve 7 is fully closed and the engine speed is increased is performed. Therefore, the in-manifold negative pressure can be promptly increased, and thus, the amplitude of the vibration caused within the resonant frequency range can be reduced. Moreover, the engine speed can promptly be reduced, and thus, the length of time that the engine speed remains within the resonant frequency range can be shortened. As a result, the vibration caused in the vehicle while stopping the engine can suitably be suppressed.

In this case, in this embodiment, the intake shutter valve 7 is adjusted to the control-wise fully closed position once, and then the ECU 60 reduces the opening of the intake shutter valve 7 even more from the control-wise fully closed position to reach the mechanically fully closed position. Thus, the flow of gas through the intake shutter valve 7 can be blocked while application of the excess load on the intake shutter valve 7 is suppressed, and the in-manifold negative pressure can effectively be increased.

According to this embodiment, when the engine stop request is issued, in addition to the in-manifold negative pressure increase control described above, the exhaust pressure increase control in which the flaps 5c of the turbocharger 5 are fully closed is performed. Therefore, the engine speed can effectively be reduced by the exhaust pressure generated within the exhaust passage 41. Thus, the length of time that the engine speed remains within the resonant frequency range during deceleration can be shortened even more.

According to this embodiment, when the engine stop request is issued, in addition to the in-manifold negative pressure increase control and the exhaust pressure increase control described above, the engine load increase control in which the loads of the alternator 26 and the air conditioner are increased is performed. Therefore, the engine speed can be reduced more effectively. Thus, the length of time that the engine speed remains within the resonant frequency range during deceleration can significantly be shortened.

In this case, in this embodiment, the alternator 26 is temporarily turned off at the timing when the engine stop request is issued, and then the alternator 26 is turned on after the predetermined time period from this timing. Therefore, the sharp increase of the battery voltage by the generated power from the alternator 26 can be prevented.

<Modifications>

Next, modifications of this embodiment are described.

In this embodiment, the example in which the present invention is applied to the intake shutter valve 7 is described; however, the present invention is applicable to a general throttle valve. Each of the intake shutter valve 7 and throttle valve may be referred to as the "intake control valve."

In this embodiment, the flaps 5c of the turbocharger 5 are fully closed as the exhaust pressure increase control; however, alternatively/additionally, the exhaust shutter valve 49 may be fully closed as the exhaust pressure increase control. Even if the exhaust shutter valve 49 is fully closed when the engine stop request is issued, the exhaust pressure can be increased to reduce the engine speed. However, since a distance from the exhaust shutter valve 49 to the engine E is longer than a distance from the flaps 5c of the turbocharger 5 to the engine E, and the exhaust gas leaks from the exhaust shutter valve 49, fully closing the exhaust shutter valve 49 causes a lesser effect of increasing the exhaust pressure than fully closing the flaps 5c of the turbocharger 5.

In this embodiment, since the power generated by the alternator 26 is supplied to the battery, in view of preventing the sharp increase of the battery voltage, the alternator 26 is not immediately turned on once the engine stop request is issued (specifically, the alternator 26 is turned on after the third time period from the issuance of the engine stop request); however, if a configuration in which the power generated by the alternator 26 is supplied to a capacitor is applied, such an issue regarding the battery does not occur, and therefore, the alternator 26 may be immediately turned on once the engine stop request is issued. Note that since the effect of shortening the length of time that the engine speed remains within the resonant frequency range by reducing the engine speed with the load caused by the alternator 26 can be obtained as long as the alternator 26 is turned on by the timing that the engine speed is at least close to reaching the resonant frequency range, in the configuration in which the power generated by the alternator 26 is supplied to the capacitor, the alternator 26 is not necessarily immediately turned on once the engine stop request is issued.

In this embodiment, after the first time period from the issuance of the engine stop request, the engine speed increase instruction is switched from on to off and the target speed of the engine speed is reduced (see S24 and S25 in FIG. 6); however, without using the first time period, the engine speed increase instruction may be switched off from on and the target speed of the engine speed may be reduced when either one of the target speed of the engine speed and the actual engine speed is at the final target speed. At the same time or thereafter, the fuel injection may be stopped.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

| DESCRIPTION OF REFERENCE CHARACTERS | |
| --- | --- |
| 1 | Intake Passage |
| 5 | Turbocharger |
| 5a | Compressor |
| 5b | Turbine |
| 5c | Flap |
| 7 | Intake Shutter Valve |

| DESCRIPTION OF REFERENCE CHARACTERS | |
|---|---|
| 8 | Intercooler |
| 20 | Fuel Injection Valve |
| 26 | Alternator |
| 41 | Exhaust Passage |
| 43 | High-pressure EGR Device |
| 43b | High-pressure EGR Valve |
| 48 | Low-pressure EGR Device |
| 48c | Low-pressure EGR Valve |
| 49 | Exhaust Shutter Valve |
| 60 | ECU |
| 200 | Engine System |
| E | Engine |

What is claimed is:

1. A control apparatus for an engine comprising an intake passage, an intake control valve, a fuel injector, and an alternator configured to generate electric power via a drive force of the engine, the control apparatus comprising:
a controller configured to execute a first step of determining whether an engine stop request has issued, the controller being operatively coupled to the intake control valve, the fuel injector, and the alternator;
the controller further configured to execute a second step of fully closing, responsive to the first step of determining that the engine stop request has issued, the intake control valve configured to adjust a flow rate of intake air passing through the intake passage of the engine;
the controller further configured to execute a third step of increasing an engine speed to reach a target speed, responsive to the second step of fully closing the intake control valve by the controller;
the controller further configured to execute a fourth step of stopping a fuel injection by the fuel injector, responsive to the third step of increasing the engine speed by the controller; and
the controller further configured to execute a fifth step of increasing a load of the alternator to be greater than a load of the alternator during the third step, responsive to the fourth step of stopping the fuel injection, wherein the intake control valve is configured to be a throttle valve;
an intercooler, configured to cool intake air, is provided in the intake passage; and
the throttle valve is configured in the intake passage, upstream of the intercooler.

2. The control apparatus of claim 1, wherein the engine is provided with a turbocharger including movable flaps configured to adjust a turbocharging pressure, and
wherein the controller is further configured to fully close the flaps of the turbocharger when the engine stop request is issued.

3. The control apparatus of claim 1,
wherein the controller is further configured to increase the load of the alternator when the engine stop request is issued.

4. The control apparatus of claim 3, wherein the controller suspends operation of the alternator once the engine stop request is issued, and resumes the operation of the alternator to increase the load of the alternator after a predetermined period of time from the issuance of the engine stop request.

5. The control apparatus of claim 1, wherein the controller is further configured to increase a load of an air conditioner when the engine stop request is issued.

6. The control apparatus of claim 1, wherein the engine is provided with an exhaust shutter valve configured to adjust a flow rate of exhaust gas flowing through an exhaust passage of the engine, and
wherein the controller is further configured to close the exhaust shutter valve when the engine stop request is issued.

7. The control apparatus of claim 1, wherein the engine is provided with an EGR device including:
an EGR passage configured to recirculate exhaust gas within the exhaust passage into the intake passage; and
an EGR valve configured to adjust a flow rate of the exhaust gas passing through the EGR passage, and
wherein the controller is further configured to close the EGR valve of the EGR device when the engine stop request is issued.

8. The control apparatus of claim 1, wherein the controller adjusts the intake control valve to a control-wise fully closed position that is not a completely closed state, and then the controller further adjusts the intake control valve from the control-wise fully closed position to a mechanically fully closed position that is the completely closed state.

9. The control apparatus of claim 1, wherein the increases a fuel injection amount to increase the engine speed.

10. The control apparatus of claim 1, wherein the controller is configured to increase the load of the alternator when a predetermined time period has elapsed after the engine stop request has issued and before the engine speed drops to reach a resonant frequency range.

11. A control apparatus for an engine comprising an intake passage, an intake control valve, a fuel injector, and a turbocharger, the control apparatus comprising:
a controller operatively coupled to the intake control valve, the fuel injector, and the turbocharger, the controller being configured to:
fully close, when an engine stop request is issued, the intake control valve for adjusting a flow rate of intake air passing through the intake passage of the engine;
increase an engine speed to reach a target speed after the intake control valve is fully closed by the controller; and
stop a fuel injection by the fuel injector after the engine speed is increased by the controller, wherein
the intake control valve is configured to be a throttle valve;
the engine is provided with a turbocharger including movable flaps configured to adjust a turbocharging pressure; and
the controller is further configured to fully close the flaps of the turbocharger after a timing when the engine stop request is issued and before a timing when the controller stops the fuel injection.

12. The control apparatus of claim 11, further comprising:
an intercooler configured to cool intake air and provided in the intake passage, wherein
the throttle valve is configured in the intake passage, upstream of the intercooler;
the engine is further provided with an exhaust shutter valve configured to adjust a flow rate of exhaust gas flowing through an exhaust passage of the engine; and
the controller is operatively coupled to the exhaust shutter valve and is further configured to fully close the exhaust shutter valve when the engine stop request is issued.

13. A control apparatus for an engine comprising an intake passage, an intake control valve, a fuel injector, and an alternator configured to generate electric power via a drive force of the engine, the control apparatus comprising:
- a controller operatively coupled to the intake control valve, the fuel injector, and the alternator, the controller configured to:
- adjust an opening of the intake control valve for adjusting a flow rate of intake air passing through the intake passage of the engine;
- increase an engine speed to reach a target speed after the intake control valve is fully closed by the controller;
- stop a fuel injection by the fuel injector after the engine speed is increased by the controller; and
- increase a load of the alternator to be greater than a load of the alternator when the engine speed is increased by the controller, responsive to the fuel injection being stopped by the controller, wherein
- when an engine stop request is issued, the controller is configured to reduce the opening of the intake control valve from a first opening degree to a second opening degree;
- the first opening degree is an opening degree of the intake control valve when the engine stop request is issued; and
- the second opening degree is smaller than the first opening degree; and
- the controller is configured to stop the fuel injection when the opening of the intake control valve is less than the first opening degree and the engine speed is increased above an engine speed that the engine is running at when the engine stop request is issued.

14. The control apparatus of claim 13, wherein the controller controls the opening of the intake control valve to be less than the first opening degree after the engine stop request is issued and before the engine speed becomes substantially zero.

15. The control apparatus of claim 13, wherein the intake control valve is configured to be a throttle valve.

16. The control apparatus of claim 15, further comprising:
- an intercooler configured to cool intake air and provided in the intake passage, wherein the throttle valve is configured in the intake passage, upstream of the intercooler.

* * * * *